(12) United States Patent
Lin (10) Patent No.: US 6,481,057 B2
(45) Date of Patent: Nov. 19, 2002

(54) POSITIONING HINGE ADAPTED BETWEEN A COMPUTER MAIN BODY AND A DISPLAY

(76) Inventor: Wen-Chi Lin, No. 105, Wen-Hua St., Chiung-Lin Hsiang, Hsinchu Hsien (TW)

( * ) Notice: Subject to any disclaimer, the term of this patent is extended or adjusted under 35 U.S.C. 154(b) by 0 days.

(21) Appl. No.: 09/811,645

(22) Filed: Mar. 20, 2001

(65) Prior Publication Data

US 2002/0133908 A1 Sep. 26, 2002

(51) Int. Cl.[7] .............................................. E05C 17/64
(52) U.S. Cl. .............................. 16/340; 16/337; 16/298
(58) Field of Search ........................... 16/340, 337, 302, 16/305, 307, 285, 298, 299; 403/146; 361/680–683; 248/917–923, 284.1

(56) References Cited

U.S. PATENT DOCUMENTS

| | | | | | |
|---|---|---|---|---|---|
| 5,022,778 A | * | 6/1991 | Lu | ................................ | 16/273 |
| 5,037,231 A | * | 8/1991 | Kitamura | ..................... | 16/299 |
| 5,109,570 A | * | 5/1992 | Okada et al. | .................. | 16/289 |
| 5,208,944 A | * | 5/1993 | Lu | ................................ | 16/278 |
| 5,239,731 A | * | 8/1993 | Lu | ................................ | 16/340 |
| 5,269,047 A | * | 12/1993 | Lu | ................................ | 16/340 |
| 5,467,504 A | * | 11/1995 | Yang | ............................. | 16/342 |
| 5,702,197 A | * | 12/1997 | Chen | ............................. | 16/342 |
| 5,772,351 A | * | 6/1998 | Ching | ........................... | 16/337 |
| 5,894,633 A | * | 4/1999 | Kaneko | ......................... | 16/306 |
| 5,970,580 A | * | 10/1999 | Katoh | ........................... | 16/337 |
| 6,163,928 A | * | 12/2000 | Chung | .......................... | 16/337 |

* cited by examiner

Primary Examiner—Chuck Y. Mah
(74) Attorney, Agent, or Firm—Fei-Fei Chao; Venable, Baetjer, Howard & Civiletti, LLP (57) ABSTRACT

A positioning hinge for a notebook computer has multiple collars each provided with an obliquely formed friction plate. The friction plate engages a side face of an extension of a bracket configured to attach securely to a body of the computer to provide the necessary friction force to hole the monitor at an angle relative to the body of the computer. With such an arrangement, the friction force can be adjusted to accommodate different weights of the monitor by reducing or increasing the number of the collars.

17 Claims, 14 Drawing Sheets

POSITIONING HINGE ADAPTED BETWEEN A COMPUTER MAIN BODY AND A DISPLAY

BACKGROUND OF THE INVENTION

1. Field of the Invention

The present invention relates to a positioning hinge, and more particularly to a positioning hinge having multiple collars engaged with a bracket to which a computer body is securely mounted and a hinge pin to which a computer monitor is securely mounted. The multiple collars are configured to provide different friction forces to support the computer monitor with respect to the bracket, such that a suitable friction force is applied to support the monitor based on the weight of the monitor.

2. Description of Related Art

Positioning hinges generally provide a friction force to hold the monitor of a notebook computer at a desired angle. Different models and brands of notebook computers have different weights and sizes. To accommodate computers with different weights, different kinds of positioning hinges have been developed to solve manufacturers' specific requirements. However, each positioning hinge design provides only one fixed friction force to hold a specific monitor with respect to the body of the notebook computer. Consequently, if the production line changes from one specification to another, all the related parts have to be changed accordingly. The manufacturer will have to pay for all the design, development and testing cost associated with a design change, even though the change may only involve a change in weight of a specific part. In other word, there is no part that is able to be used between different specifications of parts.

Figure 14:
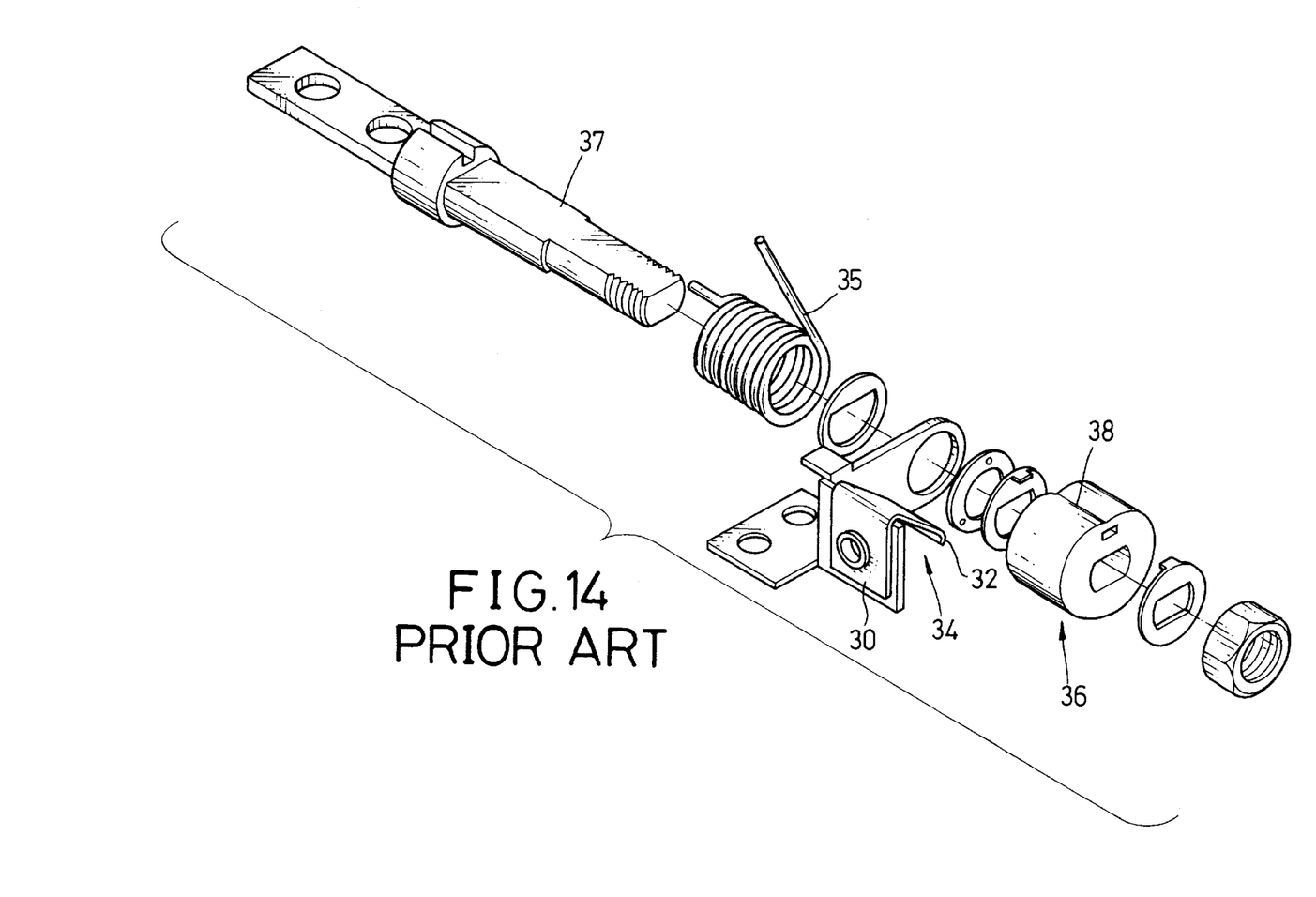
FIG. 14 is an exploded perspective view of a conventional positioning hinge.

With reference to FIG. 14, a conventional positioning hinge is mainly composed of a positioning device (34) having an attachment arm (30) and a friction plate (32) and a cam (36) with a groove (38) defined to correspond to the friction plate (32). A spring (35) is secured between a positioning hinge pin (37) and the positioning device (34). With the foregoing structure, the manufacturer will have to use many different parts to assemble a positioning hinge to meet the friction force requirement to lift and hold the monitor.

To overcome the shortcomings, the present invention tends to provide an improved positioning hinge to mitigate and obviate the aforementioned problems.

SUMMARY OF THE INVENTION

The main objective of the invention is to provide a positioning hinge in which the friction force can be adapted to secure and hold the weight of a monitor when the monitor is opened. The positioning hinge in accordance with the present invention has a positioning hinge pin, a bracket, a spring securely held between the positioning hinge pin and the bracket and multiple collars engaged with a side of the bracket. The friction force between the bracket and the collars is able to be adapted to cope with the weight of the monitor so that when the monitor is opened, the monitor is held in position.

Another objective of the invention is to provide a positioning hinge that has less parts than the conventional positioning hinge as described in the background. Thus, the fabrication cost can be reduced.

Other objects, advantages and novel features of the invention will become more apparent from the following detailed description when taken in conjunction with the accompanying drawings.

DETAILED DESCRIPTION OF PREFERRED EMBODIMENT

Figure 1:
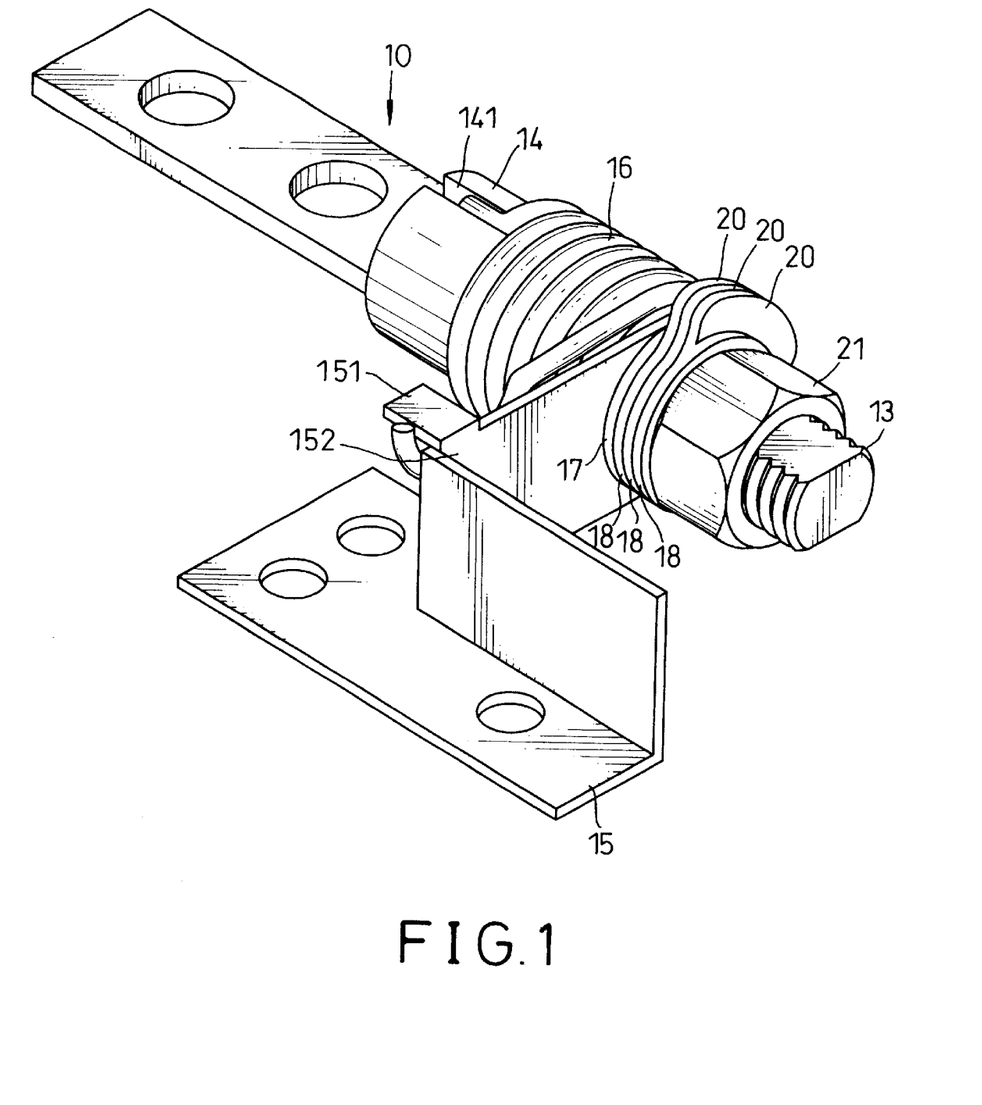
FIG. 1 is a perspective view of the positioning hinge in accordance with the present invention.
Figure 2:
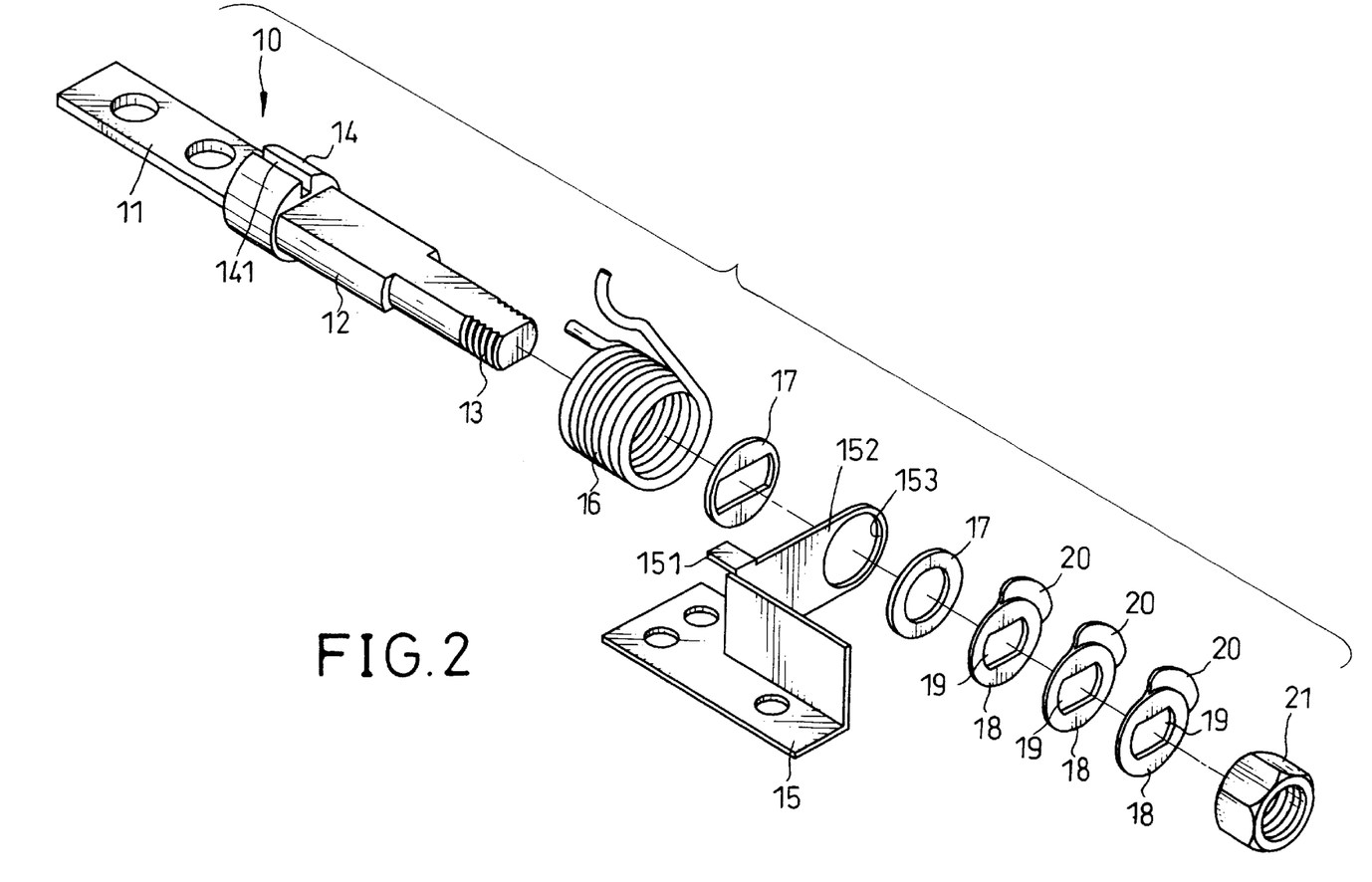
FIG. 2 is an exploded perspective view of the positioning hinge in FIG. 1.

With reference to FIGS. 1 and 2, a positioning hinge in accordance with the present invention has an elongated positioning hinge pin (10), a bracket (15), a spring (16), at least two washers (17), multiple collars (18) and a nut (21).

The positioning hinge pin (10) has an attachment plate (11) on one end, a truncated section (12) on the other end and an annular flange (14). The attachment plate (11) is configured to be securely attached to the body of a computer. The truncated section (12) is with a threaded end (13). The flange (14) is formed at the joint of the attachment plate (11) and the truncated section (12) and has a longitudinal slit (141).

The bracket (15) is configured to be securely attached to the monitor of the computer and has a tab (151) extending out from a side face of the bracket (15).

The spring (16) is mounted around the truncated section (12) and is held by the flange (14). The ends of the spring (16) are respectively held by the slit (141) and the tab (151) of the bracket (15). One protruding end of the spring (16) is securely received in the slit (141) and the other protruding end of the spring (16) abuts the bottom of the tab (151).

At least on washer (17) is provided on each side of an extension (152) of the bracket (15). The extension (152) has a through hole (153) defined to correspond to the truncated section (12) of the positioning hinge pin (10) to allow the truncated section (12) to extend through the through hole (153) in the extension (152).

Each collar (18) has a keyed opening (19) defined to allow the truncated section (12) to extend through the opening (19). When the truncated section (12) extends through the openings (19) of the collars (18), the nut (21) is screwed onto the threaded end (13) of the positioning hinge pin (10). A friction plate (20) is obliquely formed on the outside edge of each collar (18). After the assembly of all the parts and the positioning hinge pin (10) rotates relative to the bracket (15), the friction plate (20) on the collar (18) engages with a side face of the extension (152) to provide the necessary friction force to hold the monitor in place.

Figure 3:
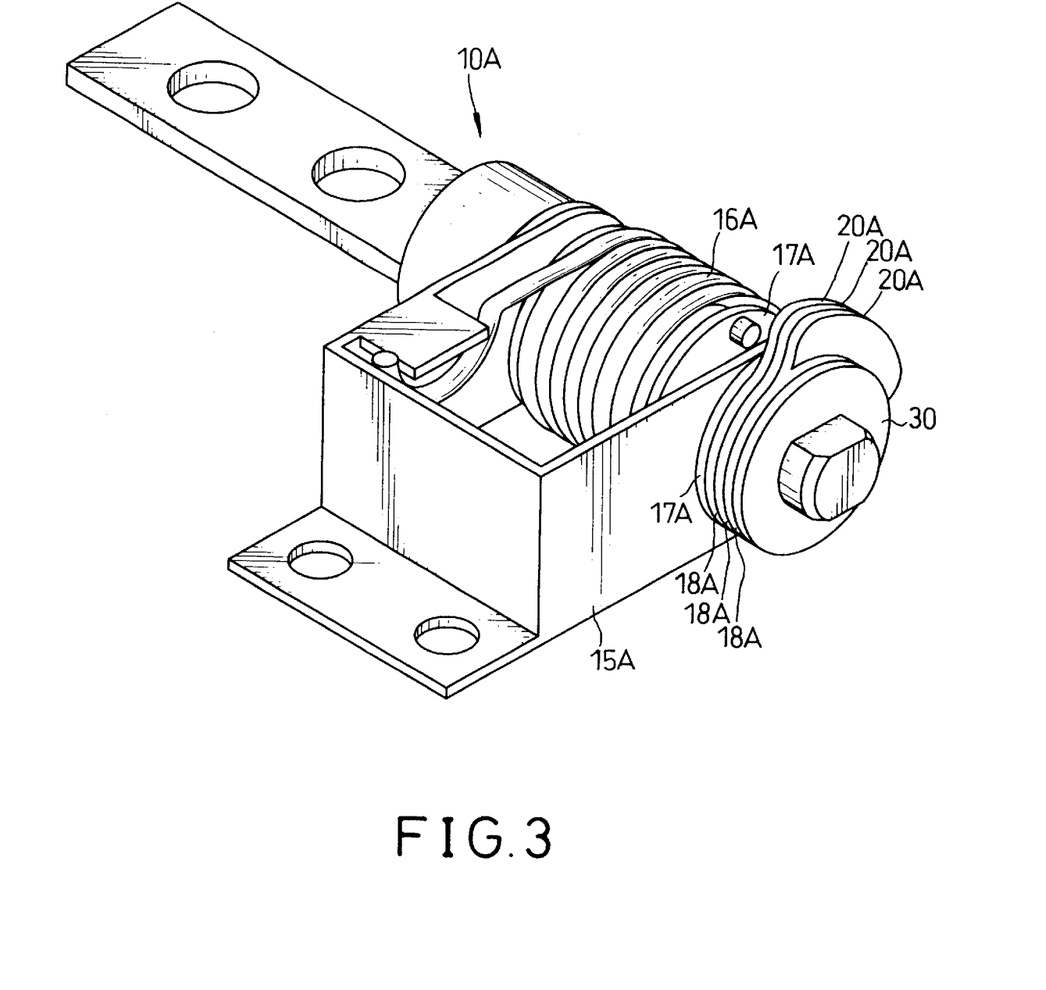
FIG. 3 is a perspective view of another embodiment of the positioning hinge in accordance with the present invention.
Figure 4:
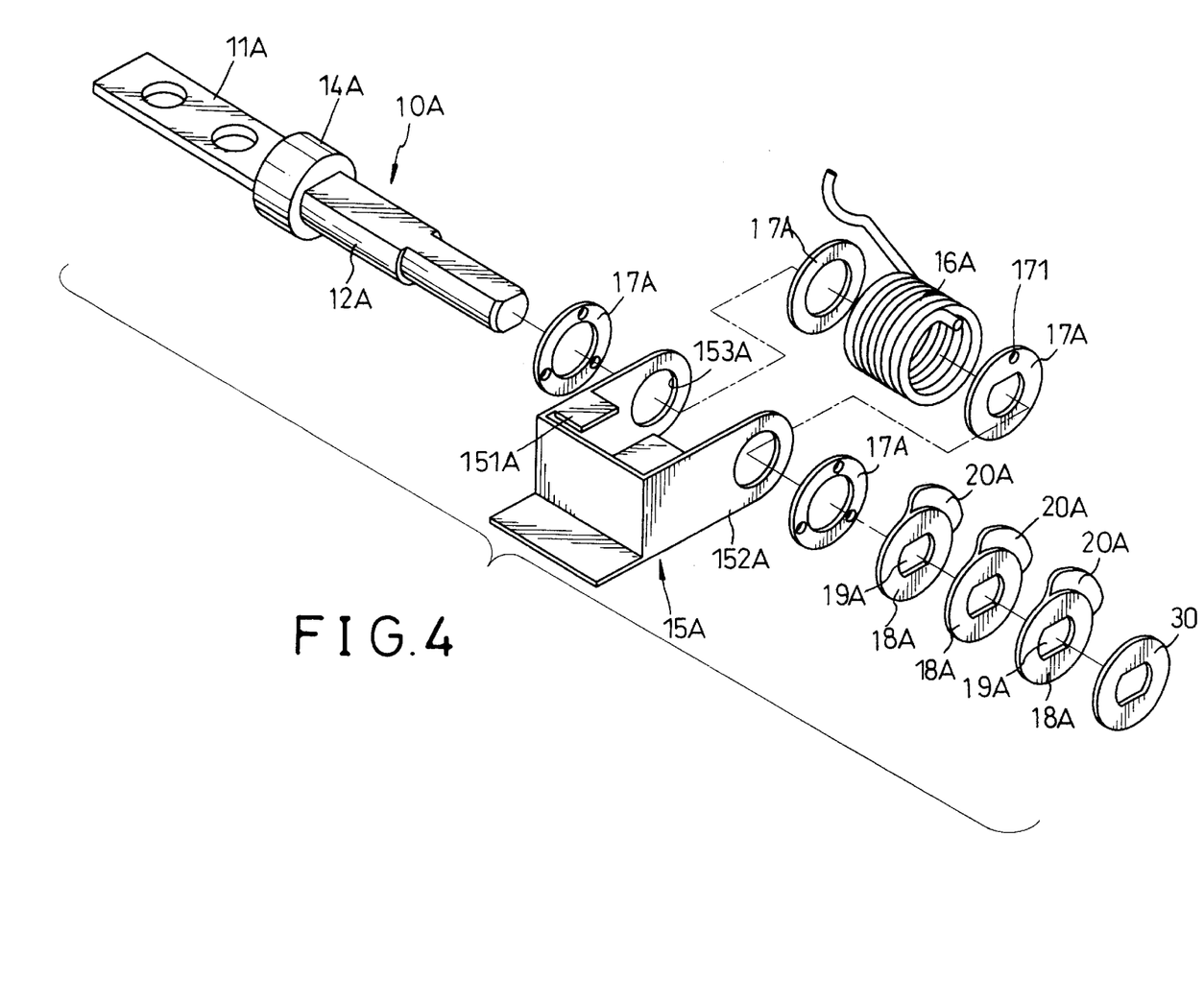
FIG. 4 is an exploded perspective view of the positioning hinge in FIG. 3.

With reference to FIGS. 3 and 4, another embodiment of the positioning hinge in accordance with the present invention has an elongated positioning hinge pin (10A), a bracket (15A), a spring (16A), at least two washers (17A) and multiple collars (18A).

The positioning hinge pin (10A) has an attachment plate (11A) on one end, a truncated section (12A) on the other end and an annular flange (14A). The attachment plate (11A) is configured to be securely attached to the body of a computer. The flange (14A) is formed at the junction of the attachment plate (11) and the truncated section (12).

The bracket (15A) is configured to be securely attached to the monitor of the computer and has a tab (151A) extending out from a side face of the bracket (15A).

The spring (16A) is mounted around the truncated section (12A) and is held by the bracket (15A). One distal end of the spring (16A) is held by the tab (151A) on the bracket (15A) and the other distal end of the spring (16A) is inserted into an aperture (171) of a keyed washer (17A) inside the bracket (15A).

At least one washer (17A) is provided on each side of each extension (152A) of the bracket (15A). Each of the extensions (152A) has a through hole (153A) defined to correspond to the truncated section (12A) of the positioning hinge pin (10A) to allow the truncated section (12A) to extend through the through holes (153A) in the extensions (152A).

A keyed opening (19A) is defined in each collar (18A) to allow the truncated section (12A) to extend through the keyed opening (19A). After assembly of the truncated section (12A) with the bracket (15A), a retainer washer (30) is securely provided on the distal end of the truncated section (12A) to hold the collars (18A) and to prevent the collars (18A) from loosening. A friction plate (20A) is obliquely formed on the outside edge of each collar (18A). After the assembly of all the parts and the positioning hinge pin (10A) rotates relative to the bracket (15A), the friction plate (20A) on the collar (18A) engages with a side face of the extension (152A) to provide the necessary friction force to hold the monitor in place. One end of the spring (16A) securely abuts under the bottom of the tab (15A), and the other end of the spring (16A) is held in an aperture (171) in a keyed washer (17A).

Figure 5:
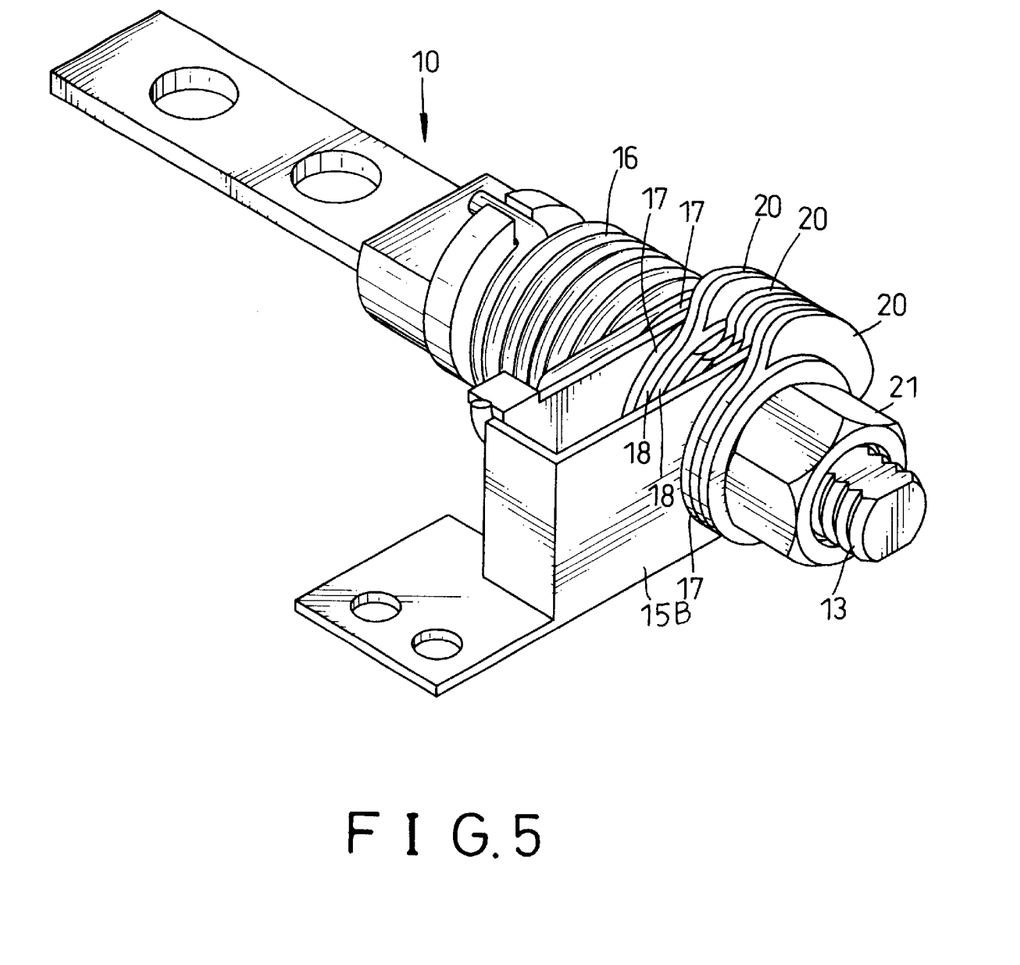
FIG. 5 is a perspective view of another embodiment of the positioning hinge in accordance with the present invention.
Figure 6:
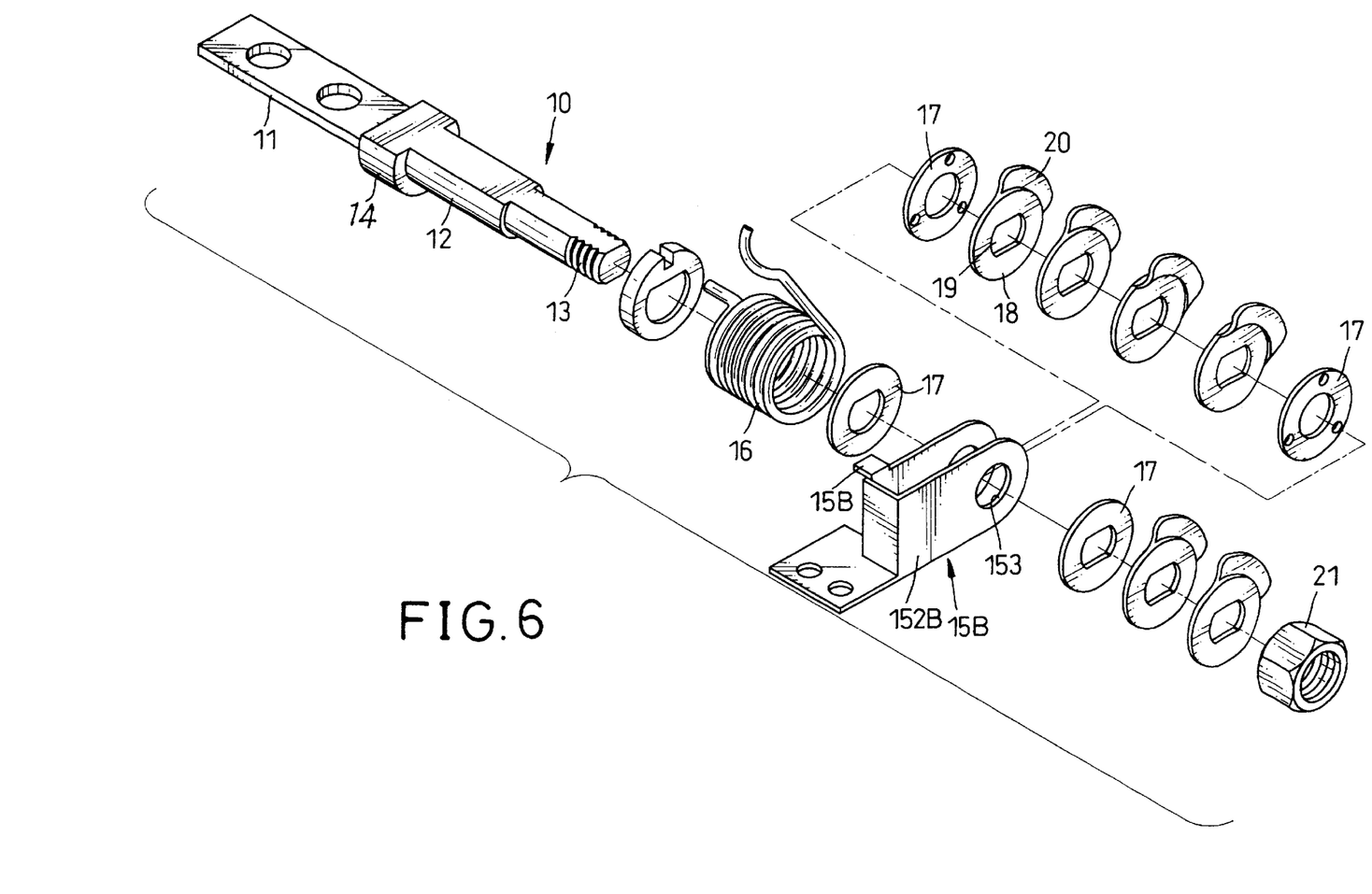
FIG. 6 is an exploded perspective view of the positioning hinge in FIG. 5.

With reference to FIGS. 5 and 6, elements identical to the previously described embodiments of FIG. 1 and FIG. 3 will use the same reference numerals.

The positioning hinge pin (10) has an attachment plate (11) on one end, a truncated section (12) on the other end and an annular flange (14). The attachment plate (11) is configured to be securely attached to the body of a computer. The truncated section (12) has a threaded end (13). The flange (14) is formed at the junction of the attachment plate (11) and the truncated section (12).

The bracket (15B) is configured to be securely attached to the monitor of the computer and has a tab (151B) extending out from a side face of the bracket (15B).

The spring (16) is mounted around the truncated section (12). One distal end of the spring (16) is held by the tab (151B), as shown in FIG. 5, and the other distal end of the spring (16) is secured in a slit (141) in the flange (14).

At least one washer (17) is provided on each side of extensions (152B) on the bracket (15B). A through hole (153B) is defined in each extension (152B) to correspond to the truncated section (12) of the positioning hinge pin (10) to allow the truncated section (12) to extend through the through holes (153B) in the extensions (152B).

A keyed opening (19) is defined in each collar (18) to allow the truncated section (12) to extend through. After the truncated section (12) passes through the openings (19) of the collars (18), the nut (21) is screwed onto the threaded end (13) of the positioning hinge pin (10). A friction plate (20) is obliquely formed on the outside edge of each collar (18). After the assembly of all the parts and the positioning hinge pin (10) rotates relative to the bracket (15B), the friction plate (20) on the collar (18) engages with a side face of the extension (152B) to provide the necessary friction force to hold the monitor in place. All the collars (18) are located between the two extensions (152B) and a washer (17) is provided between the collar (18) and a side face of the extension (152B) to avoid direct friction between the collars (18) and the extensions (152B)

Figure 7:
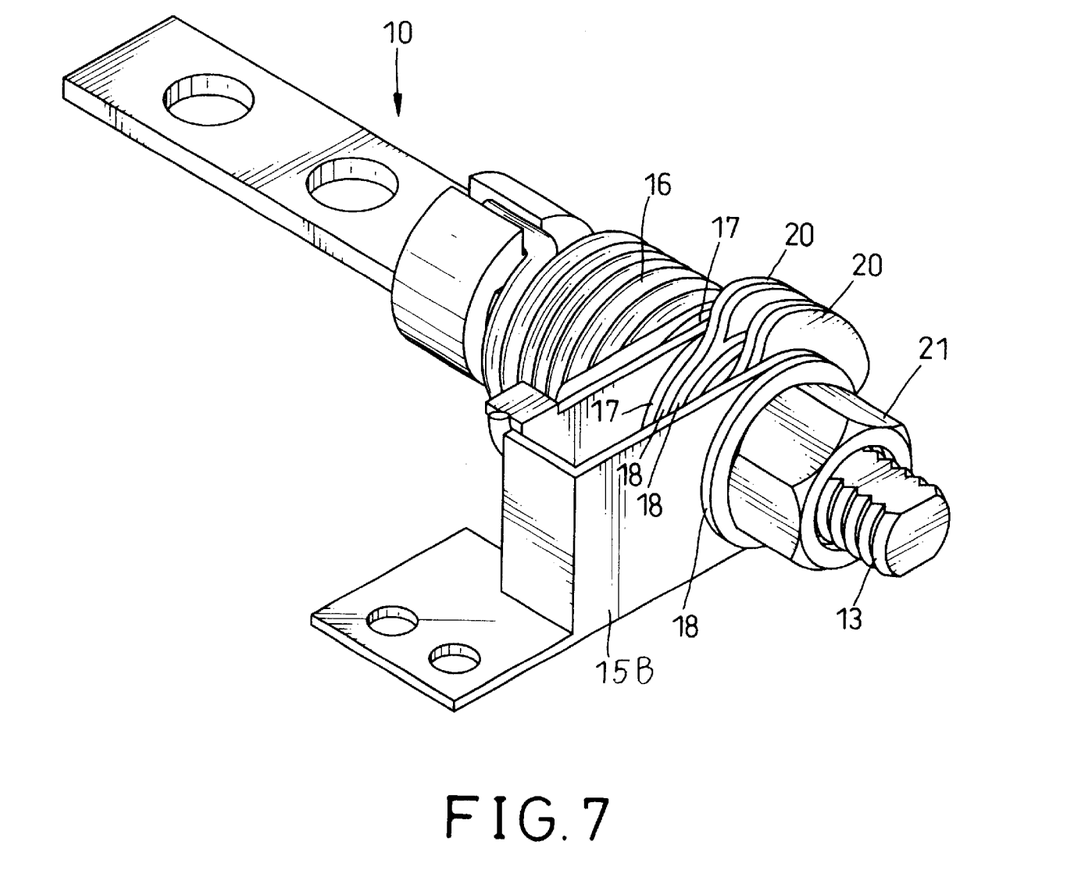
FIG. 7 is a perspective view of another embodiment of the positioning hinge in accordance with the present invention.
Figure 8:
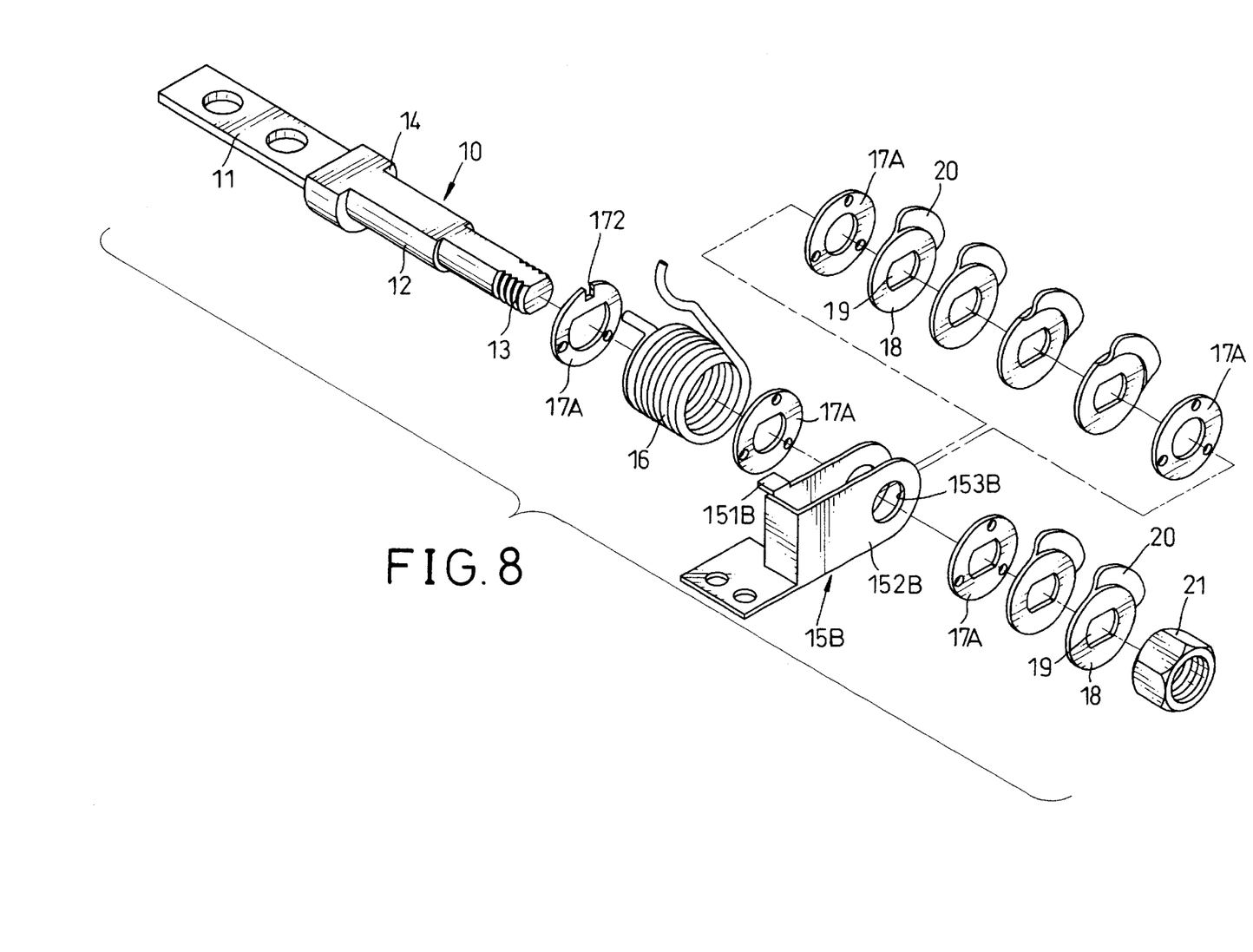
FIG. 8 is an exploded perspective view of the positioning hinge in FIG. 7.

With reference to FIGS. 7 and 8 of still another preferred embodiment of the invention, wherein elements identical to the embodiments of FIGS. 1, 3 and 5 will use the same reference numerals.

The positioning hinge pin (10) has an attachment plate (11) on one end, a truncated section (12) and a flange (14). The attachment plate (11) is configured to be securely attached to the body of a computer. The truncated section (12) has a threaded end (13). The flange (14) is formed at the junction of the attachment plate (11) and the truncated section (12).

The bracket (15B) is configured to be securely attached to the monitor of the computer and has a tab (151B) extending out from a side face of the bracket (15B).

The spring (16) is mounted around the truncated section (12) and one end of the spring (16) is held by a cutout (172) defined in a keyed washer (17A) and the other end of the spring is held by the tab (151B) of the bracket (15B).

At least one washer (17A) is provided on each side of each extension (152B) of the bracket (15B). A through hole (153B) is defined in each extension (152B) to correspond to the truncated section (12) of the positioning hinge pin (10) to allow the truncated section (12) to extend through the through holes (153B) in the extensions (152B).

A keyed opening (19) is defined in each collar (18) to allow the truncated section (12) to extend through. After the truncated section (12) passes through the openings (19) in the collars (18), the nut (21) is then screwed onto the threaded end (13) of the positioning hinge pin (10). A friction plate (20) is obliquely formed on the outside edge of each collar (18). After the assembly of all the parts and the positioning hinge pin (10) rotates relative to the bracket (15B), the friction plate (20) in the collar (18) engages with a side face of the extension (152B) to provide the necessary friction force to hold the monitor in place. Part of the collars (18) are received between the two extensions (152B), and a washer (17) is provided between the outermost/innermost collars (18) and the side face of the extension (152B) to avoid direct friction between the collars (18) and the extensions (152B). Other collars (18) are provided between the side face of the extension (152B) and the nut (21). With such an arrangement, the friction force necessary to hold the monitor of the computer can be adjusted by increasing or decreasing the number of collars (18).

Figure 9:
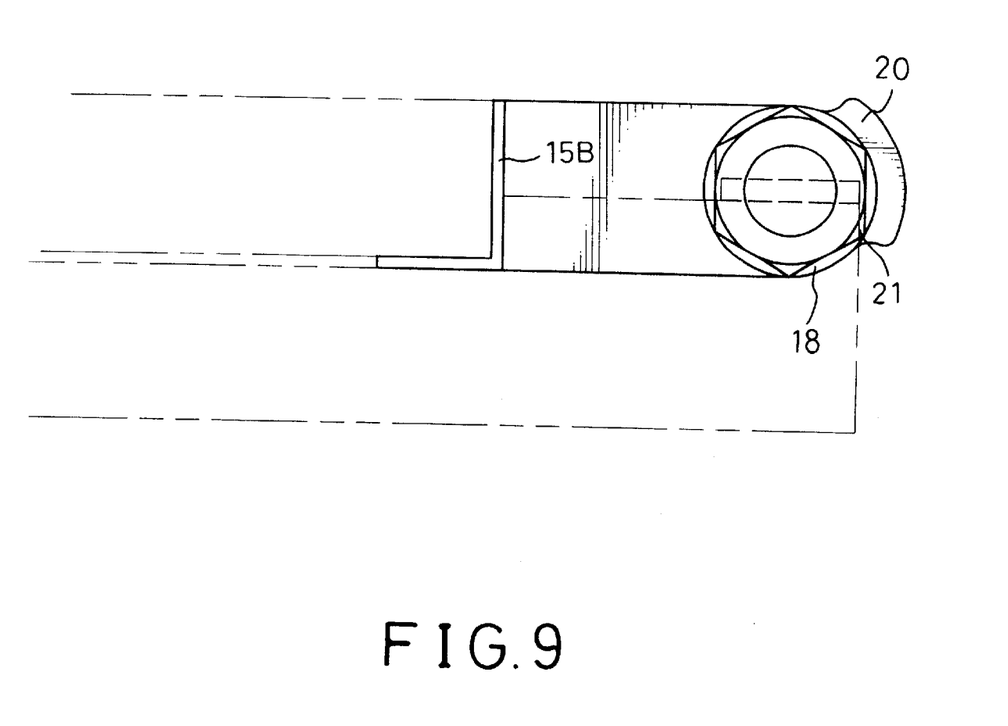
FIG. 9 is an operational end view of the positioning hinge in FIG. 1 with the notebook computer monitor closed.
Figure 10:
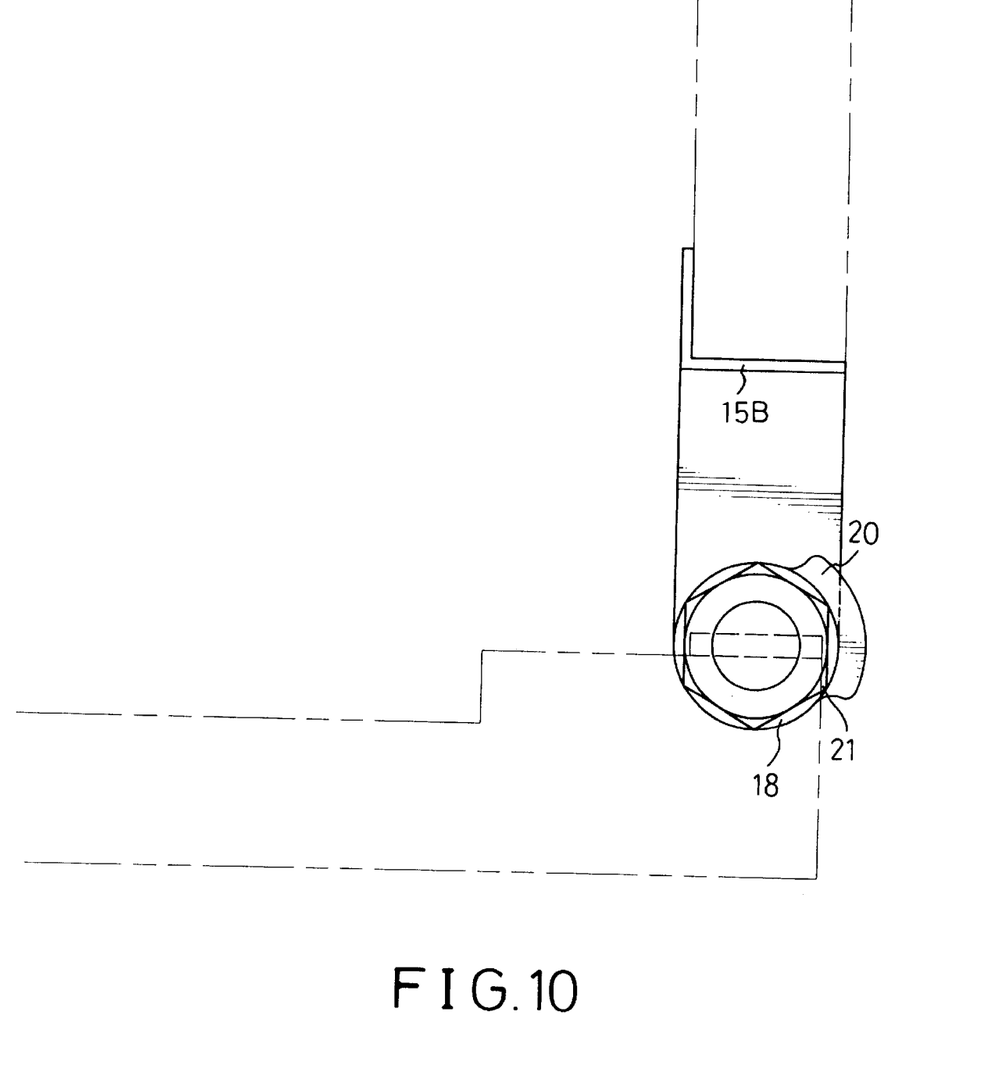
FIG. 10 is an operational end side view of the positioning hinge in FIG. 1 with the notebook computer monitor partially open.
Figure 11:
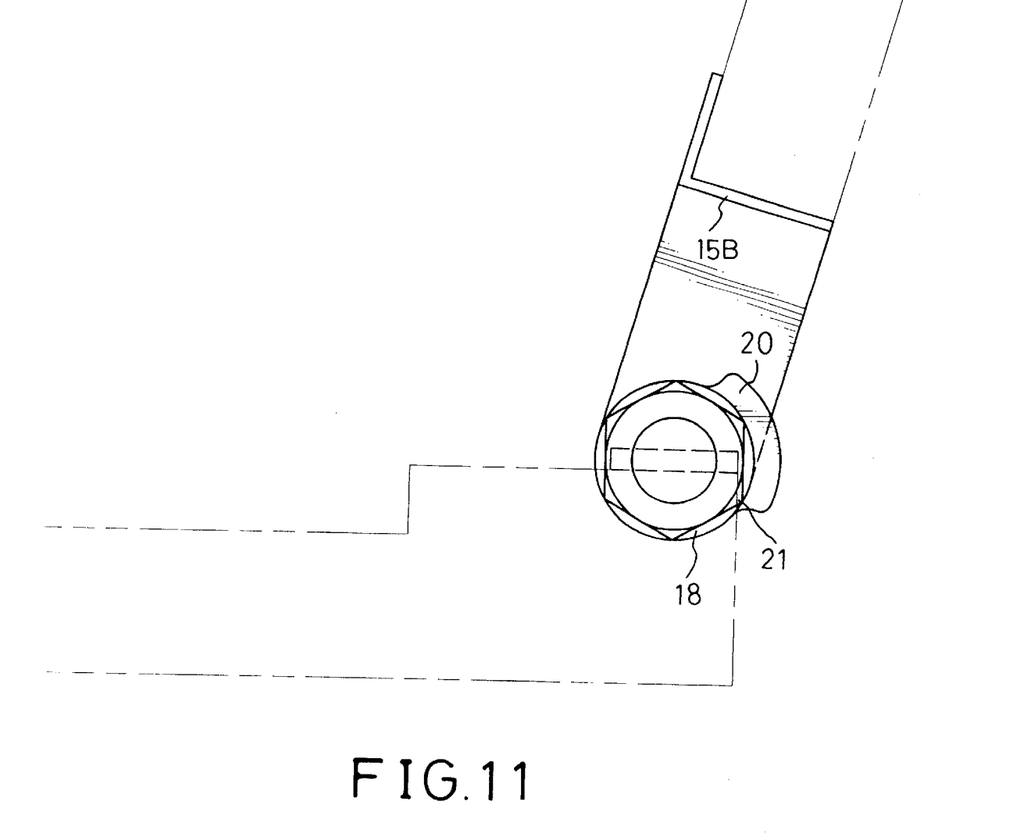
FIG. 11 is an operational end plan view of the pivot positioning hinge in FIG. 1 with the notebook computer monitor fully open.

With reference to FIGS. 9, 10 and 11, the friction plates (20) do not engage the side face of the extension (152,152A) when the monitor is closed. When the monitor moves gradually relative to the body of the computer, the friction plates (20) engage with the side face of the extension (152,152A) to provide a supporting force to hold the monitor in place.

Figure 12:
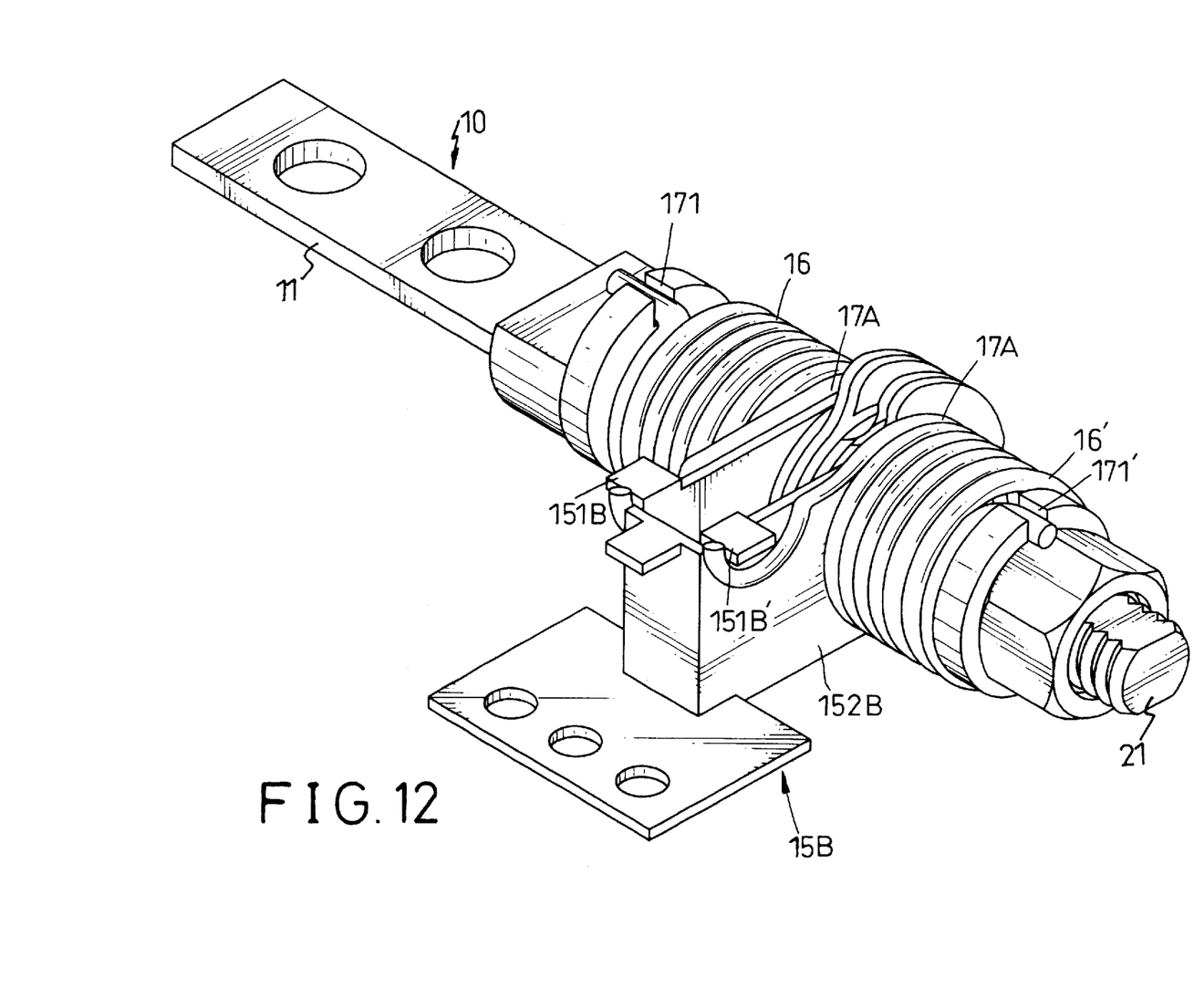
FIG. 12 is a perspective view of still another preferred embodiment of the invention.
Figure 13:
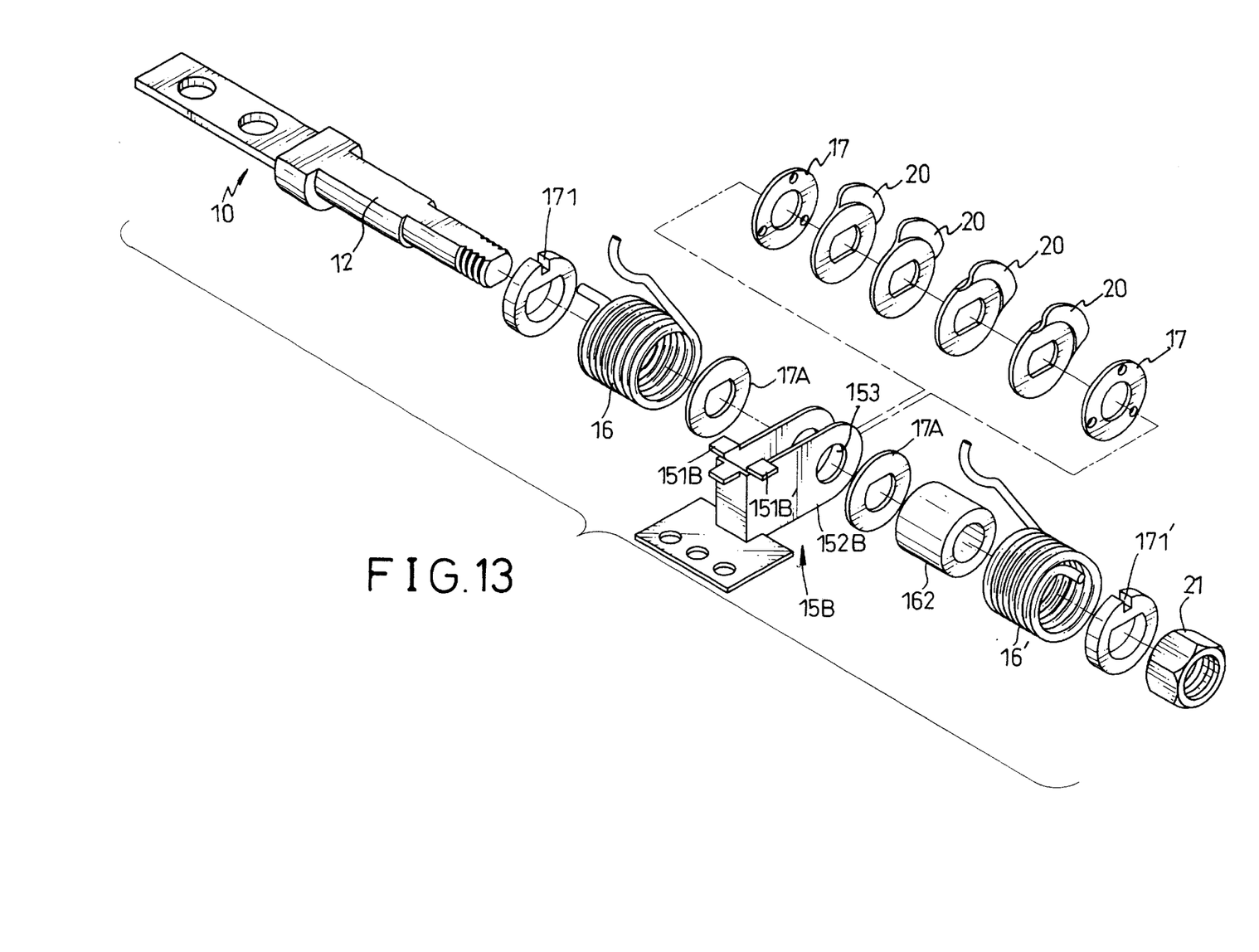
FIG. 13 is an exploded perspective view of the preferred embodiment of FIG. 12.

With still another preferred embodiment of the invention of FIGS. 12 and 13, it is noted that the positioning hinge of the invention has two springs (a first spring and a second spring (16,16')) each provided on one side of each of the two extensions (152B) of the bracket (15B). The bracket (15B) has a first tab (151B) and a second tab (151B') respectively formed on one of the two extensions (152B) and opposite with respect to each other.

The basic structure of this preferred embodiment is almost the same as those described before. However, in this embodiment, two keyed washers (17A) are provided to each of the extensions (152B) and a tube (162) is received in the second spring (16'). When the truncated section (12) of the hinge pin (10) is inserted through the through holes (153B) of the bracket (15B), as foregoing described, the truncated section (12) continues to extend through the tube (162), the second spring (16'), a keyed washer (17A), and threadingly engaged with the nut (21). It is noted from the drawings that the first ends of the first spring (16) and the second spring (16') are respectively held by the first tab (151B) and the second tab (151B') and the second ends of the first spring (16) and the second spring (16') are respectively received in the slit (171, 171'). Before the extension of the truncated section (12), the multiple collars (18) are inserted between the two extensions (152B). Thereafter, the positioning hinge is able to provide a better holding effect to the monitor to the body.

It is to be understood, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A positioning hinge for holding a monitor of a computer at a desired angle comprising:
    a positioning hinge pin having an attachment plate on one end and a truncated section with a threaded end on the other end, the attachment plate being securely attached to a monitor of a computer and the truncated section having an annular flange formed at a joint of the attachment plate and the truncated section;
    a bracket securely attached to a body of the computer and having at least one extension, each extension having a through hole, through which the truncated section of the positioning hinge pin passes;
    at least one spring mounted around the truncated section, distal ends of each spring being respectively held by the flange and the extension of the bracket;
    multiple collars each having an obliquely formed friction plate and a keyed opening defined to allow the truncated section to extend therethrough; and
    a nut screwed onto the threaded end of the positioning hinge pin after the truncated section of the positioning hinge pin passes through the keyed opening so that the multiple collars are securely mounted thereon,
    wherein the friction plates provide friction by engaging with a side face of at least one of the extensions in which the truncated section passes through, to hold the monitor in place when the positioning hinge pin pivots relative to the bracket.

2. The positioning hinge as claimed in claim 1, wherein the bracket has two extensions in parallel through which the truncated section passes, and the multiple collars are mounted on the truncated section and separated from the spring by one of the two extensions.

3. The positioning hinge as claimed in claim 2, wherein the collars are securely received between the two parallel extensions.

4. The positioning hinge as claimed in claim 2, wherein the annular flange has a slit defined to receive one distal end of the spring and the bracket has a tab formed to correspond to and restrain the other distal end of the spring.

5. The positioning hinge as claimed in claim 4, further comprising at least one washer on each side of each of the two parallel extensions of the bracket.

6. The positioning hinge as claimed in claim 2, wherein the at least one spring comprises a first and a second springs which are respectively mounted on the truncated section and separated oppositely by the two parallel extensions of the bracket,
    first distal end of the first spring is held by a slit defined in the washer adjacent to the first spring and the second spring is held by a slit defined in the other washer adjacent to the second spring; and
    second distal end of the first spring is held by a first tab formed on one of the two parallel extensions and second distal end of the second spring is held by a second tab oppositely formed on the other of the two parallel extensions of the bracket.

7. The positioning hinge as claimed in claim 9, wherein the at least one spring comprises a first and a second springs which arc respectively mounted on the truncated section and separated appositely by the two parallel extensions of the bracket,
    first distal end of the first spring is held by a slit defined in the flange adjacent to the first spring and the second spring is held by a slit defined in the washer adjacent to the second spring; and
    second distal end of the first spring is held by a first tab formed on one of the two parallel extensions and second distal end of the second spring is held by a second tab oppositely formed on the other of the two parallel extensions of the bracket.

8. The positioning hinge as claimed in claim 2, wherein a portion of the collars are received between the two parallel extensions and the other portion of the collars are separated from the at least one spring by either one of the two parallel extensions.

9. The positioning hinge as claimed in claim 5, further comprising at least one washer on each side of the two parallel extensions of the bracket.

10. The positioning hinge as claimed in claim 9, wherein the at least one spring comprises a first and a second springs which are respectively mounted on the truncated section and separated oppositely by the two parallel extensions of the bracket,
    first distal end of the first spring is held by a slit defined in the flange adjacent to the first spring and the second spring is held by a slit defined in the washer adjacent to the second spring; and second distal end of the first spring is held by a first tab formed on one of the two parallel extensions and second distal end of the second spring is held by a second tab oppositely formed on the other of the two parallel extensions of the bracket.

11. The positioning hinge as claimed in claim 5, wherein the at least one spring comprises a first and a second springs which are respectively mounted an the truncated section and separated oppositely by the two parallel extensions of the bracket, first distal end of the first spring is held by a slit defined in the flange adjacent to the first spring and the second spring is held by a slit defined in the washer adjacent to the second spring; and second distal end of the first spring is held by a first tab formed on one of the two parallel extensions and second distal end of the second spring is held by a second tab oppositely formed on the other of the two parallel extensions of the bracket.

12. The positioning hinge as claimed in claim 2, further comprising at least one washer on each side of each of the two parallel extensions of the bracket.

13. The positioning hinge as claimed in claim 7, wherein the at least one spring comprises a fast and a second springs which arc respectively mounted on the truncated section and separated appositely by the two parallel extensions of the bracket, first distal end of the first spring is held by a slit defined in the flange adjacent to the first spring and the second spring is held by a slit defined in the washer adjacent to the second spring; and second distal end of the first spring is held by a first tab formed on one of the two parallel extensions and second distal end of the second spring is held by a second tab oppositely formed on the other of the two parallel extensions of the bracket.

14. The positioning hinge as claimed in claim 2, wherein the at least one spring comprises a first and a second springs which are respectively mounted on the truncated section and separated oppositely by the two parallel extensions of the bracket, first distal end of the first spring is held by a slit defined in the flange adjacent to the first spring and the second spring is held by a slit defined in the washer adjacent to the second spring; and second distal end of the first spring is held by a first tab formed on one of the two parallel extensions and second distal end of the second spring is held by a second tab oppositely formed on the other of the two parallel extensions of the bracket.

15. The positioning hinge as claimed in claim 2, wherein the at least one spring comprises a first and a second springs which are respectively mounted on the truncated section and separated oppositely by the two parallel extensions of the bracket, the first distal end of the first spring is held by a slit defined in the washer adjacent to the first spring and the second spring is held by a slit defined in the other washer adjacent to the second spring; and second distal end of the first spring is held by a first tab formed on one of the two parallel extensions and second distal end of the second spring is held by a second tab oppositely formed on the other of the two parallel extensions of the bracket.

16. The positioning hinge as claimed in claim 1, further comprising at least one washer on each side of each extension of the bracket.

17. The positioning hinge as claimed in claim 1, wherein the at least one spring comprises a first and a second springs which are respectively mounted on the truncated section and separated oppositely by at least one of the extensions of the bracket, first distal end of the first spring is held by a slit defined in the flange adjacent to the first spring and the second spring is held by a slit defined in the washer adjacent to the second spring; and second distal ends of the first and the second springs are respectively held by a first and a second tabs oppositely formed on at least one of the extensions of the bracket.

* * * * *